(12) United States Patent
Paulsen et al.

(10) Patent No.: US 12,381,227 B2
(45) Date of Patent: Aug. 5, 2025

(54) CARBON COATED ELECTROCHEMICALLY ACTIVE POWDER

(71) Applicant: Umicore, Brussels (BE)

(72) Inventors: Jens Paulsen, Daejeon (KR); Xin Xia, Cheonan (KR); KyungTae Lee, Asan (KR); DaeKwang Kim, Cheonan (KR)

(73) Assignee: UMICORE, Brussels (BE)

( * ) Notice: Subject to any disclaimer, the term of this patent is extended or adjusted under 35 U.S.C. 154(b) by 15 days.

(21) Appl. No.: 18/211,382

(22) Filed: Jun. 19, 2023

(65) Prior Publication Data

US 2023/0335746 A1 Oct. 19, 2023

Related U.S. Application Data

(62) Division of application No. 15/026,016, filed as application No. PCT/EP2014/069746 on Sep. 17, 2014, now abandoned.

(30) Foreign Application Priority Data

Oct. 2, 2013 (EP) ..................... 13004760

(51) Int. Cl.
*H01M 4/136* (2010.01)
*H01M 4/04* (2006.01)
(Continued)

(52) U.S. Cl.
CPC ......... *H01M 4/625* (2013.01); *H01M 4/0471* (2013.01); *H01M 4/136* (2013.01);
(Continued)

(58) Field of Classification Search
None
See application file for complete search history.

(56) References Cited

U.S. PATENT DOCUMENTS

| 3,116,975 A | 1/1964 | Cross et al. |
| 5,910,382 A | 6/1999 | Goodenough et al. |

(Continued)

FOREIGN PATENT DOCUMENTS

| CN | 1830103 A | 9/2006 |
| CN | 101510623 A | 8/2009 |

(Continued)

OTHER PUBLICATIONS

USPTO; Non-Final Action for U.S. Appl. No. 15/026,016, dated Jun. 20, 2018, 28 pages.
(Continued)

*Primary Examiner* — Yoshitoshi Takeuchi
(74) *Attorney, Agent, or Firm* — NK Patent Law (57) ABSTRACT

The invention relates to an electrochemically active powder comprising particles containing a compound represented by formula $A_aM_m(XO_4)_n$ wherein A comprises an alkaline metal; M comprises at least one transition metal and optionally at least one non-transition metal; and X is chosen among S, P and Si; wherein $0<a\leq3.2$; $1\leq m\leq2$; and $1\leq n\leq3$; wherein said particles are at least partially coated with a layer comprising a carbonaceous material, said carbonaceous material comprising a highly ordered graphite, wherein said highly ordered graphite has a ratio $(I_{1360}/I_{1580})$ of a peak intensity $(I_{1360})$ at 1360 cm$^{-1}$ to a peak intensity $(I_{1580})$ at 1580 cm$^{-1}$, obtained by Raman spectrum analysis, of at most 3.05.

18 Claims, 2 Drawing Sheets (51) Int. Cl.
*H01M 4/1397* (2010.01)
*H01M 4/36* (2006.01)
*H01M 4/58* (2010.01)
*H01M 4/62* (2006.01)
*H01M 10/0525* (2010.01)
*H01M 4/02* (2006.01)
*H01M 10/052* (2010.01)

(52) U.S. Cl.
CPC ......... *H01M 4/1397* (2013.01); *H01M 4/366* (2013.01); *H01M 4/5825* (2013.01); *H01M 10/0525* (2013.01); *H01M 2004/028* (2013.01); *H01M 10/052* (2013.01)

(56) References Cited

U.S. PATENT DOCUMENTS

| | | |
|---|---|---|
| 2002/0047112 A1 | 4/2002 | Hosoya et al. |
| 2002/0106564 A1 | 8/2002 | Okawa et al. |
| 2002/0114754 A1* | 8/2002 | Hosoya ............... H01M 4/5825 429/231.95 |
| 2002/0150816 A1 | 10/2002 | Sakai et al. |
| 2002/0195591 A1 | 12/2002 | Ravet et al. |
| 2003/0129494 A1 | 7/2003 | Kaneda et al. |
| 2004/0033360 A1 | 2/2004 | Armand et al. |
| 2008/0241690 A1* | 10/2008 | Delacourt ............... C01B 25/37 252/521.2 |
| 2009/0111024 A1* | 4/2009 | Wurm ................. H01M 4/5825 429/231.95 |
| 2009/0148771 A1 | 6/2009 | Ishii et al. |
| 2009/0197174 A1* | 8/2009 | Levassbur ............. H01M 4/366 429/231.95 |
| 2009/0280411 A1 | 11/2009 | Ohira et al. |
| 2010/0065787 A1* | 3/2010 | Armand ................. C01B 25/37 252/519.1 |
| 2010/0086852 A1* | 4/2010 | Gibot ...................... C01B 25/45 252/182.1 |
| 2010/0327222 A1* | 12/2010 | Levasseur ........... H01M 4/5825 252/182.1 |
| 2011/0212365 A1* | 9/2011 | Audemer ............ H01M 4/5825 429/221 |
| 2012/0231352 A1 | 9/2012 | Pol et al. |
| 2013/0052535 A1 | 2/2013 | Yanagihara et al. |
| 2016/0240856 A1 | 8/2016 | Paulsen et al. |

FOREIGN PATENT DOCUMENTS

| | | |
|---|---|---|
| JP | 2001015111 A | 1/2001 |
| JP | 2004014340 A | 1/2004 |
| JP | 2004014341 A | 1/2004 |
| JP | 2009212074 A | 9/2009 |
| JP | 2010151038 A | 7/2010 |
| JP | 2012234766 A | 11/2012 |
| JP | 2013069566 A | 4/2013 |
| WO | 2005051840 A1 | 6/2005 |

OTHER PUBLICATIONS

USPTO; Final Action for U.S. Appl. No. 15/026,016, dated Sep. 28, 2018, 12 pages.
USPTO; Non-Final Action for U.S. Appl. No. 15/026,016, dated May 9, 2019, 18 pages.
USPTO; Final Action for U.S. Appl. No. 15/026,016, dated Aug. 16, 2019, 16 pages.
USPTO; Non-Final Action for U.S. Appl. No. 17/026,016, dated Sep. 8, 2020, 17 pages.
ISA/EP; International Search Report for International Patent Application No. PCT/EP2014/069746 dated Oct. 17, 2014, 3 pages.
Brunauer, Stephen, et al., "Adsorption of Gases in Multimolecular Layers", Contribution from the Bureau of Chemisstrey and Soils and George Washington University, Feb. 1938, pp. 309-319, vol. 60.
Rietveld, H.M., "A Profile Refinement Method for Nuclear and Magnetic Structures", J. Appl. Cryst., 1969, pp. 65-71, vol. 2.

* cited by examiner figure 1 figure 2 figure 3

CARBON COATED ELECTROCHEMICALLY ACTIVE POWDER

CROSS-REFERENCE TO RELATED APPLICATIONS

This application is a divisional of U.S. patent application Ser. No. 15/026,016, filed Mar. 30, 2016, which was a national stage application of International Patent Application No. PCT/EP2014/069746, filed on Sep. 17, 2014, which claims the benefit of European Patent Application No. 13004760.8, filed on Oct. 2, 2013.

TECHNICAL FIELD AND BACKGROUND

The invention relates to an electrochemically active powder comprising carbon-coated particles, said particles containing an electrochemically active compound, the compound preferably having an olivine or NASICON structure. The invention also relates to a process for manufacturing said powder and to various products containing said powder. In particular the invention relates to a positive electrode comprising said powder and to a battery, in particular lithium-ion battery, containing said electrode.

An electrochemically active powder is for instance known from US 2009/0148771 A1 wherein a lithium (Li)-based powder is disclosed. Said powder comprises lithium phosphate based particles, which are known for their electrochemical activity. In particular, said publication discloses a particulate $LiM_xPO_4$ compound with M being among others manganese, iron, nickel and magnesium; with $0 \leq X \leq 1$; and having a mean particle diameter of between 50 nm and 500 nm. Said particulate compound is used as active material in a cathode, wherein it is mixed with a carbon material, e.g. graphite, and with a binder.

A known limitation of the known electrochemically active powders, e.g. powders based on lithium phosphates such as $LiFePO_4$, is their low conductivity, which in turn may restrict a broad application thereof. In particular lithium-ion battery-driven electrical devices requiring a high rate performance of their battery may not perform up to the required intended use. In order to improve the conductivity and achieve better electrochemical performance of such materials, many approaches have been applied, e.g. addition of carbon, carbon coating, metal doping, particle size control, etc.

For example, US 2009/0148771 A1 discloses that the addition of a particulate carbon material to a $LiFePO_4$ powder improves the performance of a positive battery electrode containing thereof. Said publication further demonstrates that when said carbon material contains an increased amount of graphite, better results were achieved. To quantify the amount of graphite in the particulate carbon material, the inventors in US 2009/0148771 A1 used a ratio $(I_{1380}/I_{1580})$ of a peak intensity $(I_{1380})$ at 1,360 cm$^{-1}$ to a peak intensity $(I_{1580})$ at 1,580 cm$^{-1}$ obtained by Raman spectrum analysis. As explained therein, the peak intensity $I_{1580}$ is attributed to the graphitized carbon, whereas the peak intensity $I_{1380}$ is attributed to the disordered carbon and for ratios as low as 0.25, a very good performance was achieved.

However, another optimal way to improve the conductivity of known electrochemically active powders and in particular of those powders based on lithium phosphates such as $LiFePO_4$, is to cover the particles of the powders with a carbon coating.

Carbon coating is one of the most important techniques used to improve the powders' performance, in particular their conductivity, specific capacity, rate performance and cycling life. Various research programs showed that an effective carbon coating not only enhances the surface electronic conductivity of particulate electrochemically active materials such as lithium phosphates but it may also improve or simplify the preparation thereof. For instance, carbon coated $LiFePO_4$ can be readily prepared by milling $LiFePO_4$ particles with carbon powders or by in situ carbonization of organic precursors previously deposited on the surface of said $LiFePO_4$ particles.

However, the structure of the carbon coating applied to electrochemically active particulate materials such as the above mentioned $LiFePO_4$ particles, may significantly affect the electrochemical performance thereof. Carbon coatings prepared at high temperature (>800° C.) have much higher electronic conductivity than those prepared at lower temperatures (<600° C.). Supposedly, the cause of these benefices was the increased graphitization of the carbon coating, i.e. the presence of an increased amount of graphitized carbon in the coating to the expense of non-graphitized carbon, e.g. disordered carbon. The extent of graphitized carbon in a carbon based material and its ratio to the disordered carbon can be characterized as shown by US 2009/0148771 A1 by an ID/IG (disordered/graphite) peak intensity ratio as determined by Raman spectroscopy. The lower the ID/IG ratio, the higher the amount of graphitized carbon.

As a consequence of such insights, various attempts were made to coat electrochemically active particulate materials such as lithium phosphate based particles with graphitized carbon. Methodologies such as a) coating particles with organic precursors and using increased sintering temperatures (>800° C.) to carbonize said precursors; b) combining particles with materials having an increased amount of graphitized carbon source, e.g. carbon nanotubes, graphene, carbon nano-fibers; or c) using various catalysts, e.g. ferrocene, during sintering to achieve a higher graphitization of the carbon; were applied in attempts to enhance the properties of the electrochemically active particulate materials.

However, all the above enumerated approaches have disadvantages and none succeeded in achieving an optimal product. For instances, higher sintering temperatures not only that could result in particle agglomeration of the electrochemically active particulate materials such as lithium phosphate based particles but usually lead to an oxidation of said materials which in turn may strongly decrease their electrochemical activity. In other words, although obtaining particles coated with an acceptably graphitized carbon layer, during the sintering process, the electrochemically activity of the obtained powders is reduced below an acceptable level.

On the other hand, by reducing the sintering temperatures in an attempt to avoid its deleterious effects on the electrochemical activity of the active particulate materials, dissatisfactory carbon layers with insufficient amounts of graphitized carbon are achieved.

It may thus be an aim of the present invention to provide an electrochemically active particulate material such as particles containing a lithium phosphate based material, having acceptable electrochemical properties and being coated with a highly graphitized carbon layer. A further aim of the present invention is to provide an electrode containing a carbon-coated electrochemically active particulate material, said coating comprising a high amount of graphitized carbon, said electrode providing a battery containing thereof with optimal properties.

SUMMARY

The invention provides an electrochemically active powder comprising particles containing a compound represented by formula $A_aM_m(XO_4)_n$ wherein A comprises an alkaline metal; M comprises at least one transition metal and optionally at least one non-transition metal; and X is chosen among S, P and Si; wherein $0<a\leq3.2$; $1\leq m\leq2$; and $1\leq n\leq3$; wherein said particles are at least partially coated with a layer comprising a carbonaceous material, said carbonaceous material comprising a highly ordered graphite, wherein said highly ordered graphite has a ratio $(I_{1380}/I_{1580})$ of a peak intensity $(I_{1380})$ at 1360 cm$^{-1}$ to a peak intensity $(I_{1580})$ at 1580 cm$^{-1}$, obtained by Raman spectrum analysis, of at most 3.05.

BRIEF DESCRIPTION OF THE DRAWINGS

Hereinafter the figures are explained.

DETAILED DESCRIPTION

The present inventors surprisingly observed that the coating layer of carbonaceous material contained by the active powders of the invention had a high degree of graphitization and showed an increased uniformity. These advantageous properties may lead to an enhanced surface electronic conductivity of the active powders and to electrodes containing thereof having optimal specific capacities, enhanced rate performance and cycling life. Additional benefits of having an optimized coating may be reduced polarization effects during charge and discharge and high stability of the active powder during charge and discharge.

In particular the present inventors obtained a highly-graphitized and uniform carbon layer on the surface of lithium iron phosphate particles without the need of an expensive and complicated process. The process used to manufacture such powders, utilized relatively low sintering temperature (<800° C.) and relatively short sintering times (≤2 h). The carbon layer seems to provide the lithium iron phosphate with effective discharge capacity and rate capability.

In the compound used as active materials according to the present invention, preferably A is Li, Na or K. Preferably, M is a transition metal comprising iron, manganese, vanadium, titanium, molybdenum, niobium, tungsten, zinc and mixtures thereof, said transition metals being preferably in the following oxidation states: $Fe^{2+}$, $Mn^{2+}$, $V^{2+}$, $V^{3+}$, $Cr^{3+}$, $Ti^{2+}$, $Ti^{3+}$, $Mo^{3+}$, $Mo^{4+}$, $Nb^{3+}$, $Nb^{4+}$ and $W^{4+}$. Preferably, the non-transition metal comprises magnesium and aluminum.

In a first embodiment, the compound used in accordance with the invention has the formula LiMPO$_4$, said with compound preferably having an olivine structure, where M is a metallic cation belonging to the first line of transition metals, preferably being selected from the group consisting of Mn, Fe, Co, and Ni. Such compounds can be synthesized by using the precursors disclosed for example by U.S. Pat. No. 5,910,382 included herein by reference. Preferably, M is a combination of cations, at least one of which is selected from the group consisting of Mn, Fe, Co and Ni. More preferably M is $Fe_{1-x}Mn_x$ or $Fe_{1-x}Ti_x$ with $0<x<1$. Most preferably M is Fe.

In a second embodiment, the compound used in accordance with the invention has the formula $Li_xM_{1-y}M'_y(XO_4)_n$, in which $0\leq x\leq2$; $0\leq y\leq0.6$ and $1\leq n\leq1.5$, wherein M is a transition metal or a mixture of transition metals from the first line of the periodic table; M' is an element with fixed valence selected among $Mg^{2+}$, $Ca^{2+}$, $Al^{3+}$, $Zn^{2+}$ or a combination of these same elements; and X is chosen from among S, P and Si, with P being preferred. Such compounds can be synthesized by using the precursors disclosed for example by US 2004/0033360 A1 included herein by reference.

In a third embodiment of the invention, the compound has the formula $Li_x(M,M')PO_4$, wherein $0\leq x\leq1$, M is one or more cations selected from the group consisting of Mn, Fe, Co, Ni, and Cu, and M' is an optional substitutional cation selected from the group consisting of Na, Mg, Ca, Ti, Zr, V, Nb, Cr, Zn, B, Al, Ga, Ge, and Sn.

In a fourth preferred embodiment of the invention, the compound has the formula $Li_uM_v(XO_4)_w$ with $u=1$, 2 or 3; $v=1$ or 2; $w=1$ or 3; M has a formula $Ti_aV_bCr_cMn_dFe_eCo_fNi_gSc_hNb_i$ with $a+b+c+d+e+f+g+h+i=1$ and X is $P_{x-1}S_x$ with $0\leq x\leq1$.

In a preferred embodiment, the compound is a Li-rich compound represented by formula $Li_{1+x}M_m(XO_4)_n$, wherein $0<x\leq0.2$; $0\leq m\leq1$; and $1\leq n\leq1.05$. Preferably $0<x\leq0.2$; $0\leq m\leq1$; and $n=1$. Preferably, M is a transition metal, more preferably a transition metal chosen from the group consisting of iron, manganese, vanadium, titanium, molybdenum, niobium, tungsten, zinc and mixtures thereof. Alternatively, M has the formula $M=Fe_{1-m}M'_m$, with $0\leq m\leq0.025$, wherein M' is either one or more elements chosen from the group consisting of alkaline earth metals and non-metals. Preferably M' is chosen from the group consisting of Mg, Ca, Sr, Ba, and B. Most preferably, M' is Mg or B. Preferably, X is chosen from among S, P and Si, with P being preferred. The Li content of the compound of this embodiment is non-stoichiometrically controlled meaning that the molar ratio Li/M is more than 1.00 and in particular for powders having a NASICON structure, preferably more than 1.5.

Preferably, the particles forming the inventive powder have a mean diameter of at least 50 nm, more preferably at least 80 nm, most preferably at least 150 nm. Preferably, said mean diameter is at most 600 nm, more preferably at most 400 nm, most preferably at most at most 200 nm. The mean particle diameter of said particles is calculated from the mean value of measured longest diameters on observed images obtained, e.g., from a scanning electron microscope (SEM).

Preferably, the particles forming the inventive powder have a particle size distribution with an average particle size d50 of less than 500 nm, more preferably less than 200 nm; and preferably of more than 30 nm. The particle size distribution is preferably mono-modal. Preferably, the inventive powder is characterized by a ratio (d90−d10)/d50 of at most 1.5, more preferably of at most 1.3, most preferably at most 1.1.

In accordance with the invention, the particles forming the powder of the invention are coated with a layer comprising a carbonaceous material containing a highly ordered graphite. By carbonaceous material is herein understood a material rich in carbon, e.g. containing carbon in an amount based on the total amount of carbonaceous material of from 60 to 100% molar, and preferably having an electronic conductivity higher than $10^{-6}$ S/cm at room temperature, preferably higher than $10^{-4}$ S/cm. Other elements that can be present in the carbonaceous material are hydrogen, oxygen, nitrogen, as long as they do not interfere with the chemical inertia of the carbon during the electrochemical operation. By highly ordered graphite is herein understood a graphite having a ratio ($I_{1360}/I_{1580}$) of a peak intensity ($I_{1360}$) at 1360 cm$^{-1}$ to a peak intensity ($I_)$ at 1580 cm$^{-1}$, obtained by Raman spectrum analysis, of at most 3.05. Preferably, the ratio $I_{1360}/I_{1580}$ is at most 2.80, more preferably at most 2.60, even more preferably at most 2.40, yet even more preferably at most 2.20, most preferably at most 2.10. Preferably, the ratio $I_{1360}/I_{is}$ at least 1.5, more preferably at least 1.8, most preferably at least 2.0. Preferably, the amount of highly ordered graphite contained by said carbonaceous material is at least 22 wt % based on the total content of carbonaceous material, more preferably at least 28 wt %, most preferably at least 30 wt %. In a preferred embodiment, the carbonaceous material essentially consists of highly ordered graphite.

Preferably, said $Li_aM_m(XO_4)_n$ has a crystal size of at most 90 nm and preferably at most 85 nm. This is determined by Rietveld refinement of XRD data.

Thanks to the relatively low sintering temperatures and periods used in the disclosed method, a small crystal size combined with a relatively high degree of graphitization can be obtained, whereas in prior art methods the crystal size will grow to around 100 nm or even above if a sintering temperature and period allowing sufficient graphitization is chosen.

The layer comprising the carbonaceous material preferably has a thickness of at least 2 nm, more preferably at least 5 nm, most preferably at least 8 nm. Preferably, said layer has a thickness of at most 20 nm, more preferably at most 15 nm, most preferably at most 12 nm. Preferably, said layer has a thickness of between 2 nm and 20 nm, more preferably of between 5 nm and 15 nm, most preferably of between 8 nm and 12 nm. The thickness of said layer can be determined using Transmission Electron Microscopy.

Preferably, the particles forming the powder of the invention have a BET of at most 25 g/m$^2$, more preferably at most 20 g/m$^2$, most preferably at most 18 g/m$^2$. Preferably, said BET is at least 10 g/m$^2$, more preferably at least 12 g/m$^2$, most preferably at least 15 g/m$^2$.

In a preferred embodiment, the invention relates to a carbon coated powder comprising particles containing a compound represented by formula $Li_{1+x}FePO_4$ wherein x is at least 0.01, more preferably x is at least 0.03, most preferably x is at least 0.06; wherein said particles are at least partially coated with a layer comprising a carbonaceous material; wherein said layer has a thickness of at least 3 nm, more preferably at least 6 nm, even more preferably at least 9 nm; wherein said carbonaceous material comprises a highly ordered graphite, wherein said highly ordered graphite has a ratio ($I_{1360}/I_{1580}$) of a peak intensity ($I_{1360}$) at 1360 cm$^{-1}$ to a peak intensity ($I_{1580}$) at 1580 cm$^{-1}$, obtained by Raman spectrum, of at least 1.50 and at most 3.00, more preferably of between 1.80 and 2.40, most preferably between 1.90 and 2.10. Most preferably said carbonaceous material essentially consists of said highly ordered graphite. Most preferably the thickness of said layer is between 8 nm and 12 nm.

The invention also relates to a composition comprising the carbon-coated electrochemically active powder of the invention and preferably a binder, said composition being preferably used as an electrode material. Therefore, the invention also relates to an electrode material comprising the composition of the invention. The composition may further comprise a conductive agent, which is preferably fibrous carbon. The binder is preferably a material chosen from the group consisting of polyethers, polyesters, polymers based on methyl methacrylate units, acrylonitrile-based polymers, vinylidene fluorides and mixtures thereof. The invention further relates to an electrode comprising the electrode material of the invention.

The invention also relates to an electrochemical cell containing at least two electrodes and at least one electrolyte, wherein at least one of the electrodes, preferably the positive electrode, is the electrode of the invention. Examples of cells may include cylindrical cells and prismatic cells. Preferably, the electrolyte is a polar liquid containing one or more metallic salts in solution or a polymer, solvating or not, optionally plasticized or gelled by said polar liquid. The electrolyte can also be a polar liquid immobilized in a microporous separator, such as a polyolefin, a polyester, nanoparticles of silica, alumina or lithium aluminate $LiAlO_2$. Examples of polar liquids include cyclic or linear carbonates, alkyl formiates, oligoethylene glycols, alkylethers, N-methylpyrolidinone, y-butyrolactone, tetraalakylsulfamides and mixtures thereof.

The invention further relates to a battery containing at least one of the electrochemical cells of the invention and to various devices containing said batteries. Examples of devices may be portable electronic devices, e.g. portable computers, tablets, mobile phones; electrically powered vehicles; and energy storage systems.

The invention also relates to a method for making a carbon coated electrochemically active powder, said powder comprising particles containing a compound represented by formula $A_aM_m(XO_4)_n$ wherein $0<a\leq3.2$; $1\leq m\leq2$; and $1\leq n\leq3$; A comprises an alkaline metal; M comprises at least one transition metal and optionally at least one non-transition metal; and X is chosen among S, P and Si; preferably said powder being the inventive powder, said method comprising the steps of:
  i. providing a mixture of the following precursors:
    a. a source of an element A;
    b. a source of an element M;
    c. a source of an element X; and
    d. a source of carbon;
      wherein the sources of elements A, M and X are introduced in whole or in part in the form of compounds having the at least one source element;
  ii. heating up said mixture in a sintering chamber to a sintering temperature of at least 500° C. and sintering said mixture at said sintering temperature for a first period of time, wherein a stream of inert gas is provided to said chamber;
  iii. continuously injecting steam in said sintering chamber before, during and/or after said heating up and/or said sintering of said mixture, for an injection time; thereby producing particles containing said compound wherein the particles are at least partially coated with a carbonaceous material containing a highly graphitized carbon; and iv. cooling said powder to preferably room temperature.

Figure 1:
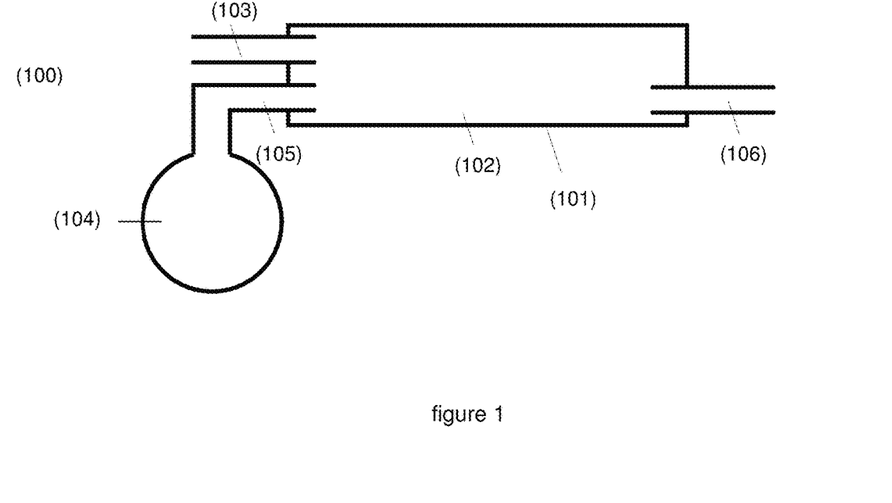
FIG. 1 shows the apparatus used to manufacture the powder of the invention.

The invention also relates to an apparatus for carrying out the inventive method. With reference to FIG. 1, the inventive apparatus (100) contains a furnace (101) having a sintering chamber (102); an inlet (103) to introduce an inert gas in said sintering chamber; a steam source (104) used to produce steam and means (105) to transport the steam and inject it into the sintering chamber (102). The furnace can also comprise an outlet (106) used to evacuate the steam in excess.

In accordance with the invention, the sources of the elements utilized therein are mixed together and said mixture is subjected to further processing. Although it is also possible to combine step i. with step ii. of the inventive method, e.g. mixing said sources of elements during heating up, it is preferred that said sources of elements are mixed before the commencing of step ii. The mixture obtained at step i. of the inventive method is preferably a homogeneous mixture, i.e. a mixture having an essentially uniform composition throughout. Homogeneous mixtures can be obtained for example by mixing said sources of elements in a ball mill, or by using horizontal or vertical attritors, rotor-stator machines, high-energy mills, planetary kneaders, shaking apparatuses or shaking tables, ultrasonic apparatuses or high shear mixers or combinations of the above-mentioned apparatuses. To achieve homogeneous mixtures, preferably the precursors are in the form of powders, preferably having a sub-micron size distribution, more preferably having a sub-micron d50 size distribution.

In a preferred embodiment of the inventive method, A is lithium and the source of lithium is preferably a compound selected from the group consisting of lithium oxide, lithium hydroxide, lithium carbonate, neutral phosphate $Li_3PO_4$, acid phosphate $LiH_2PO_4$, lithium orthosilicates, lithium metasilicates, lithium polysilicates, lithium sulfate, lithium oxalate, lithium acetate, and mixtures thereof.

Preferably, the source of M is a compound comprising a transition metal or mixture of transition metals selected from the group consisting of iron, manganese, cobalt, nickel, vanadium, titanium, chromium, and copper. In a preferred embodiment, the source of M is a compound selected from the group consisting of iron (III) oxide, magnetite, manganese dioxide, di-vanadium pentoxide, trivalent iron phosphate, trivalent iron nitrate, trivalent iron sulfate, iron hydroxyphosphate, lithium hydroxyphosphate, trivalent iron sulfate, trivalent iron nitrate, and mixtures thereof. Preferably, the source of M is a mixture of an iron-containing precursor and an M'-containing precursor. Examples of suitable iron containing precursors include iron (II) phosphate, iron (II) oxalate and iron (II) oxide. Examples of suitable M'-containing precursors include at least one compound containing Mg and B such as an oxide, hydroxide or organic complex.

Preferably, the source of X is selected from the group consisting of sulfuric acid, lithium sulfate, phosphoric acid, phosphoric acid esters, neutral phosphate $Li_3PO_4$, acid phosphate $LiH_2PO_4$, monoammonium phosphate, diammonium phosphate, trivalent iron phosphate, manganese and ammonium phosphate ($NH_4MnPO_4$), silica, lithium silicates, alkoxysilanes and partial hydrolysis products thereof, and mixtures thereof. In a preferred embodiment, the source of X is a metal sulfate, e.g., trivalent iron phosphate.

It is also possible in accordance with the invention that the source of M is also the source of X, the source of A is also the source of X; or when A is lithium, the source of lithium is also the source of X, or the source of X is also the source of lithium.

Preferably, the source of carbon is an organic precursor material or a combination of organic precursor materials. In general, any organic precursor material or combination of organic precursor materials leading to the carbonaceous material with the desired property is suitable for utilization in accordance with the present invention. Preferably, said precursors do not affect the stability of the particulate material.

Preferred precursors that can be suitably utilized as the carbon source in accordance with the invention include but are not limited to: hydrocarbons and their derivatives, especially those comprising polycyclic aromatic moieties, like pitch and tar derivatives, perylene and its derivatives; polyhydric compounds like sugars and carbon hydrates and their derivatives; and polymers. Preferred examples of such polymers include polyolefins, polybutadienes, polyvinylic alcohol, phenol condensation products, including those from a reaction with an aldehyde, polymers derived from furfurylic alcohol, polymers derivatives of styrene, divinylbenzene, naphthalene, perylene, acrylonitrile, vinyl acetate; cellulose, starch and their esters and ethers, and mixtures thereof.

Further sources of carbon that can be used in accordance with the invention are compounds of formula CY-CY wherein Y represents a halogen or a pseudo-halogen. The term pseudo-halogen means an organic or inorganic radical susceptible of existing in the form of an ion $Y^-$ and which can form a corresponding protonated compound HY. Examples of halogen and pseudo-halogen include F, Cl, Br, I, CN, SCN, CNO, OH, $N_3$, $RCO_2$, $RSO_3$ wherein R is H or an organic radical. The formation by reduction of CY bonds is preferably performed in the presence of reducing elements such as hydrogen, zinc, magnesium, $Ti^{3+}$ ions, $T^{2+}$ ions, $Sm^{2+}$ ions, $Cr^{2+}$ ions, $V^{2+}$ ions, tetrakis(dialkylamino ethylene) or phosphines. These reagents can eventually be obtained or regenerated electrochemically. Further, It can also be advantageous to use catalysts increasing the reduction kinetic. Palladium or nickel derivatives are particularly efficient, particularly in the form of complexes with phosphorous or nitrogen compounds like 2,2'-bipyridine. Similarly, these compounds can be generated chemically in an active form in the presence of reducing agents, such as those mentioned above, or electrochemically. The carbonaceous material is in such instance produced by reducing the carbon-halogen bonds according to the equation:

Compounds susceptible of generating carbon by reduction include perhalocarbons, particularly in the form of polymers, hexachlorobutadiene and hexachlorocyclopentadiene.

Another way to obtain a carbonaceous material comprises the elimination of the hydrogenated compound HY, Y being as defined above, according to the equation:

Compounds susceptible of generating carbon from reduction include organic compounds comprising an even number of hydrogen atoms and Y groups, such as hydrohalocarbons, in particular in the form of polymers, such as vinylidene polyfluoride, polychloride or polybromide, or carbon hydrates. The dehydro (pseudo) halogenation can be obtained at low temperature, including room temperature, by reacting a base with the HY compound to form a salt. Example of suitable bases include tertiary basis, amines, amidines, guanidines, imidazoles, inorganic bases such as alkaline hydroxides, organometallic compounds behaving like strong bases, such as $A(N(Si(CH_3)_3)_2$, $LiN[CH(CH_3)_2]_2$, and butyl-lithium.

In a preferred embodiment, the following compounds are used as sources to prepare a carbon-coated lithium-rich lithium iron phosphate $Li_{1+x}FePO_4$ with $0<x\leq0.2$:$Li_3PO_4$ as the source for Li and P, $Fe_3(PO_4)_2\cdot 8H_2O$ as the source for Fe and P, and cellulose for carbon, wherein the Li:Fe molar ratio was 1.06:1 and the weight ratio of carbon source was 5.85 wt % (defined as $m_{Cellulose}/m_{Li3PO3}+m_{Fe3(PO4)2\cdot 8H2O}$).

For convenience, the sources of the elements utilized in accordance with the present invention are hereinafter called precursors.

Figure 2:
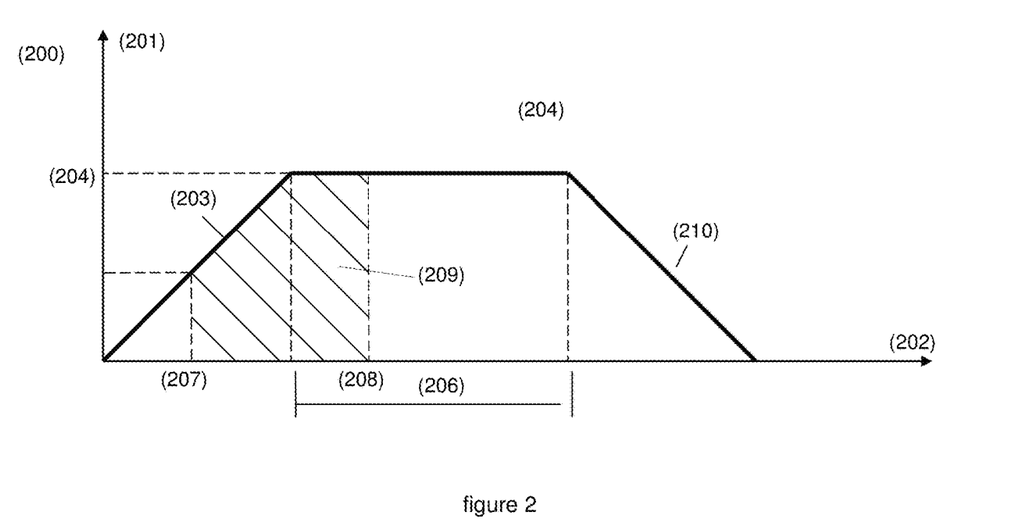
FIG. 2 shows a temperature profile, i.e. temperature vs. time, used in a process to manufacture the powder of the invention.

In accordance with the invention and with reference to FIG. 2 showing the temperature (201) profile in time (202), the mixture of precursors, i.e. the mixture containing the sources of the elements utilized in the present invention, is heated up with a heating rate (203) to a temperature (204) where the sintering of the mixture takes place. Said temperature which is herein referred to as the sintering temperature is preferably at least 500° C., more preferably at least 550° C., most preferably at least 600° C. Preferably, the sintering temperature is at most 800° C., more preferably at most 750° C., most preferably at most 700° C. Preferably, the sintering temperature is between 500° C. and 800° C., more preferably between 550° C. and 750° C., most preferably between 600° C. and 700° C. The sintering temperature can be constant during the sintering process or it can vary. In case the sintering temperature varies during the sintering process, by sintering temperature in herein understood the average of the variations. The sintering temperature is considered as the temperature of the sintering chamber as measured with typical means utilized to read such high temperatures.

Preferably, said mixture is heat up with a heating rate (203) of at least 3° C./min, more preferably of at least 5° C./min, most preferably of at least 6° C./min. Preferably, said mixture is heat up with a heating rate of at most 15° C./min, more preferably of at most 10° C./min, most preferably of at most 8° C./min. Preferably, said heating rate is between 3° C./min and 15° C./min, more preferably between 5° C./min and 10° C./min, most preferably between 6° C./min and 8° C./min.

The time used for sintering (206), hereinafter referred to as the sintering time, is preferably at least 60 min, more preferably at least 80 min, most preferably at least 100 min. Said sintering time is preferably at most 600 min, more preferably at most 300 min, most preferably at most 180 min. Said sintering time is preferably between 60 and 600 min, more preferably between 80 and 300 min, most preferably between 100 and 180 min.

In accordance with the invention, steam is continuously injected in the sintering chamber before, during and/or after said heating up and/or said sintering of said mixture, for an injection time. By continuous injection is herein understood that fresh steam is continuously supplied to the sintering chamber throughout the injection time. For example, in one embodiment, a first steam-injection is carried out during the heating-up step for a first injection time and a second steam-injection is carried out during the sintering step for a second injection time. In another embodiment, a steam-injection is commenced during the heating-up step (207) and extended uninterruptedly to the sintering step wherein said steam-injection during sintering is carried out for at least part (208) of said sintering step. In FIG. 2, the time for which steam is injected is shown by the shaded area (209). It is also possible to commence the steam-injection before or during the heating up, sintering and/or cooling step.

For convenience, when a temperature is mentioned, the unit considered to express the temperature is always ° C., unless otherwise expressly indicated.

In a first preferred embodiment of the inventive method, the steam is continuously injected in the sintering chamber during heating up said mixture of precursors to the sintering temperature. Preferably the steam injection commences (204) during said heating up when the temperature in the sintering chamber is at least a fifth of the sintering temperature, more preferably at least a third of the sintering temperature. In case a sintering temperature of between 500° C. and 800° C. is used, the steam injection preferably commences during said heating up when the temperature in the sintering chamber is at least 150° C., more preferably at least 200° C., most preferably at least 250° C.

In a second preferred embodiment, the steam injection commences when the temperature in the sintering chamber is substantially equal with the sintering temperature (202).

In a third preferred embodiment, the steam injection commences (207) when the temperature in the sintering chamber is below the sintering temperature but preferably at least a fifth of said sintering temperature and the steam injection is extended uninterruptedly to the sintering step; wherein said steam-injection during sintering is carried out for least part of said sintering step; wherein the steam injection during the sintering step is carried out for an injection time of at most ¾ of the total sintering time, more preferably of at most ½ of the total sintering time, most preferably of at most ¼ of the total sintering time. Preferably, the steam injection during the sintering step is carried out for an injection time of at least ¹⁄₁₀, more preferably of at least ⅕ of the total sintering time.

Preferably the steam injection is uninterruptedly carried out during a total injection time of at least about ¼ of the time needed to both heat up and sinter said mixture of precursors, more preferably of at least about ⅓, most preferably of at least about ½. Preferably, said steam injection is carried out uninterruptedly during at least part of the heating up step and at least part of the sintering step. Preferably, the steam injection is extended to the sintering step, i.e. there is no discontinuity in steam injection between the heating up step and sintering step.

In accordance with the invention, the steam is injected into the sintering chamber during an injection time, which can vary from seconds to hours. For example, in a preferred embodiment, the injection time during the heating up step is at least 25% of the total time needed to heat up said mixture of precursors to the sintering temperature, more preferably at least 50%, most preferably at least 75%. In a further preferred embodiment, the injection time during the sintering step is at least 10% of the total sintering time, more preferably at least 15%, even more preferably at least 20%, most preferably at least 75%. In a third preferred embodiment, the injection time during the heating up step is at least 25% of the total time needed to heat up said mixture of precursors to the sintering temperature, more preferably at least 50%, most preferably at least 75% and the injection time during the sintering step is at least 10% of the total sintering time, more preferably at least 15%, even more preferably at least 20%, most preferably at least 75% and there is no discontinuity in the steam injection between the heating up step and sintering step.

In a preferred embodiment of the inventive method, steam is injected in the sintering chamber during a part, preferably the initial part, of the sintering step, the remaining part, preferably the last part, of the sintering step being carried out in a steam-free atmosphere.

The steam is preferably injected at atmospheric pressure in the sintering chamber and is preferably water-based, i.e. water is mainly used as the liquid medium used to produce the steam. Preferably, when injected, the steam is at a temperature of at least 150° C., more preferably at least 200° C., most preferably at least 250° C. The temperature of the steam can be increased for example by mixing the water-based steam with flammable gases and igniting said gases thereby transferring heat to the steam. It is particularly advantageous to use a water-based steam and allow water to react with the precursors since better results are obtained. In particular it is preferred to adjust the steam injection such that an amount of at least 1.5 L of water per 150 g of active material participate are reacted, more preferably at least 2.0 L. most preferably at least 2.5 L. Preferably said amount of reacted water is at most 1.5 L, more preferably at most 2.0 L, most preferably at most 2.5 L. The amount of reacted water can be calculated from the difference between the amount of water introduced as steam and the amount of water captured at the end of the method of the invention.

The steam can be supplied to and injected in the sintering chamber from a steam source via suitable piping for example. Any conventional steam sources using conventional materials and conventional steam producing methods can be used in accordance with the invention. The steam can also be collected from the sintering chamber and condensed to recover the liquid medium used to produce said steam, e.g. water.

Preferably, the steam is injected with a flow rate of at least 10 L/min, more preferably at least 20 L/min, most preferably at least 25 L/min. Preferably, the steam is injected with a flow rate of at most 50 L/min, more preferably at most 40 L/min, most preferably at most 30 L/min.

By sintering chamber is herein understood the chamber wherein the heating up and sintering of the mixture of precursors takes place. By injecting steam in the sintering chamber is herein understood that an atmosphere containing steam is provided in said sintering chamber.

In accordance with the invention, the sintering chamber is provided with a stream of an inert gas. Examples of such gases include nitrogen, carbon dioxide, or noble gases such as helium or argon, or mixtures thereof. Although called inert gas, said gas may also contain small amounts of reactive gases, e.g. hydrogen. In a preferred embodiment, the inert gas is a mixture containing a small amount of a reactive gas, preferably hydrogen, and an inert gas with a majority of said inert gas; preferably in a volume ratio inert gas/$H_2$ of 99 to 95:1 to 5 v/v, wherein the another inert gas is preferably nitrogen. The inert gas is used to blanket the reactive precursors used in accordance with the invention to prevent unwanted reactions from taking place. Preferably, the stream of inert gas is provided to the sintering chamber throughout the entire process of preparing the powders of the invention.

After forming the inventive particles, the obtained powder is cooled to preferably room temperature. The cooling rate (210) is preferably at least 1° C./min, more preferably of at least 2° C./min, most preferably of at least 4° C./min. Preferably, said cooling rate of at most 10° C./min, more preferably of at most 7° C./min, most preferably of at most 5° C./min. Preferably, said cooling rate is between 1° C./min and 10° C./min, more preferably between 2° C./min and 7° C./min, most preferably between 4° C./min and 5° C./min.

It is to be recognized that different implementations of the inventive method are possible, especially regarding the processing conditions, the nature of the different precursors and their sequence of blending.

It was observed that with the inventive method, relatively short sintering times can be utilized to produce qualitative electrochemically active powders. It was also surprisingly observed that said method delivers qualitative powders in an energy saving manner and at an economical cost.

The invention will be further explained with the help of the following examples and comparative experiments, without being however limited thereto.

Method for Measuring

Electrochemical performances are tested in CR2032 coin type cells, with a Li foil as counter electrode in a lithium hexafluorite (LiPF$_6$) type electrolyte at 25° C. The active material loading is 4.75 (±0.2) mg/cm$^2$. Cells are charged to 4.0V and discharged to 2.5V to measure rate performance and capacity. The current density applied is calculated by that 1 C discharge gets 140 mAh/g specific capacity of the active materials.

Electronic conductivity of a carbonaceous material can be measured in accordance with the method disclosed in US2002/0195591.

Carbon structure of the samples was measured by Raman Spectroscope using a JASCO NRS 3100 High Resolution Dispersive Raman Microscope equipped with a solid state laser at a wavelength of 532 nm.

The microstructure characterization of the samples is performed by Transmission Electron Microscopy (TEM) using a JEOL3100F Field Emission TEM.

The particle size distribution can be determined following the methodology disclosed in WO 2005/051840.

The BET of particles can be determined by $N_2$ adsorption method developed by Brunauer, S., Emmett, P. H., and Teller, E., *J. Am. Chem. Soc.* 60: 309-319 (1938).

Crystal sizes were determined as follows: XRD patterns were recorded on a Rigaku D/MAX 2200 PC X-ray diffractometer in the 17-144 2-theta range in a 0.02 degree scan step. Scan speed was set to 1.0 degree per minute. A goniometer with theta/2theta Bragg Brentano geometry was used having has a radius of 185 mm. A copper target X-ray tube was operated at 40 KV and 40 mA. A diffracted beam monochromator, based on a curved graphite crystal, was used to remove KBeta Cu radiation. An incident beam optic setup was used comprising a 10 mm divergent height limiting slit (DHLS), a 1-degree divergence slit (DS) and 5 degree vertical Soller slit. The diffracted beam optic setup included a 1-degree anti-scatter slit (SS), 5 degree vertical Soller slit and 0.3 mm reception slit (RS). Crystal size was calculated by Bruker AXS Topas 3.0 software, by using Rietveld refinement method as disclosed in H. M. Rietveld (1969), J. Appl. Crystallography 2 (2): 65-71

Example 1

A blend containing $Fe_3(PO4)_2 \cdot 8H_2O$ as the source for Fe, $Li_3PO_4$ as the source for Li and $PO_4$ and cellulose as the source for carbon, was dried in $N_2$ at 240° C. for 1 h. The Li:Fe ratio in the blend was 1.06:1. The ratio $M_{Cellulose}/(M_{Li3PO4}+M_{Fe3(PO4)2 \cdot 8H2O})$ was 5.85 wt %.

After drying, the blend was transferred into a furnace provided with an inlet for steam injection and provided with a stream of an inert gas composed of $N_2/H_2$(99:1, v/v). The blend was heated up to a sintering temperature of 600'C and sintered at that temperature for 2 h. The heating up rate was 5° C./min. Steam injection into the furnace commenced during the heating up of said furnace when the temperature in the furnace reached 250° C. and it was extended uninterrupted to the sintering step. The total steam injection time was 100 minutes. The total sintering time in the presence of steam amounted to 0.5 h. The temperature profile and an indication of when steam injection is carried out are shown in FIG. 2.

After sintering the obtained powder was cooled to room temperature with a cooling rate of 5° C./min.

Comparative Experiment 1

The process of Example 1 was repeated without using steam injection.

Comparative Experiment 2

Commercial carbon-coated LiFePO$_4$ samples from Prayon (Prayon FE100, CAS No: 15365-14-7, Product code: PR-038) were investigated.

Powder Analysis

Figure 3:
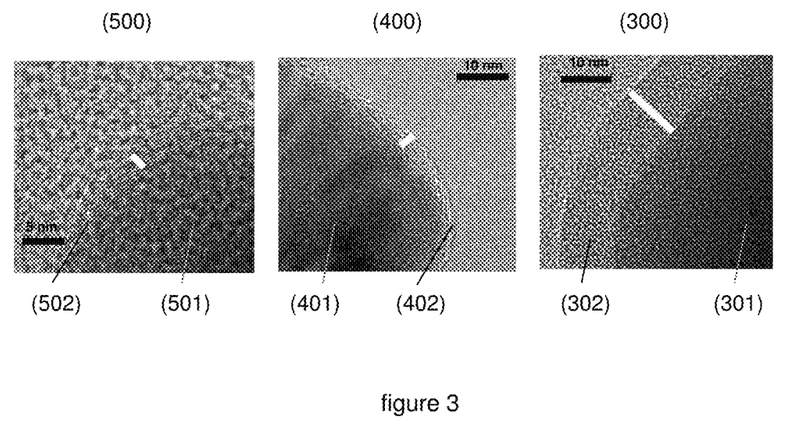
FIG. 3 shows pictographs of representative particles of the powder of the invention and those of powders used for comparison.

FIG. 3 shows Transmission Electron Microscopy (TEM) pictographs of the powders of Ex. 1 (300) and C. Exp. 1 (400) and 2 (500), respectively. The powder of Ex 1 contains particles (301) coated with a carbon coating layer (302) having a thickness of around 10 nm, whereas the carbon coatings (402 and 502) on the particles (401 and 501) forming the powders of the Comparative Experiments have a thickness of maximum about 3 nm.

Table 1 further shows the peak-intensity ratio $I_{1360}/I_{1580}$ as obtained by Raman Spectroscopy of the obtained powders. As detailed above, the ratio $I_{1360}/I_{1580}$ is an indication of the extent of carbon's graphitization. The lower the ratio $I_{1360}/I_{1580}$, the higher the extent of graphitization, i.e. the amount of highly ordered graphite in the carbon layer. Example 1 shows the lowest ratio $I_{1360}/I_{1580}$ indicating that the carbon layer has a high amount of highly ordered graphite.

TABLE 1

| sample | $I_{1360}/I_{1580}$ | Ratio |
| --- | --- | --- |
| Example1 | 27447/13378 | 2.05 |
| C. Exp. 1 | 9448/2019 | 4.68 |
| C. Exp. 2 | 83229/27088 | 3.07 |

Electrochemical Behavior

The electrochemical behavior of the powders obtained by the processes of the Example and Comparative Experiments was studied in so called coin cells. A slurry was prepared by mixing the obtained powders with 10 wt % carbon black and 10 wt % PVDF into N-Methyl Pyrrolidone (NMP) and deposited on an Al foil as current collector. The obtained electrode containing 80 wt % active material was used as the positive electrode in the manufacturing of the coin cells, using a loading of 6 mg/cm$^2$ active material. The negative electrodes were made of metallic Li. The coin cells were cycled in LiBF$_2$ based electrolyte between 2.5 and 40 V at various C-rates.

Table 2 shows the electrochemical performance of the coin cells wherein the powders of the Example, Comparative Experiments 1 and 2, respectively, were used as the active material. It is immediately observable that Example 1 shows the highest charge capacity (CQ1), highest discharge capacity (DQ1) and best rate capabilities in all C-rate tests even at a high rate as 20 C

TABLE 2

| Sample | CQ1 (mAh/g) | DQ1 (mAh/g) | IRRQ1 (%) | 1 C | 5 C | 10 C | 15 C | 20 C | DV1 | DV6 |
| --- | --- | --- | --- | --- | --- | --- | --- | --- | --- | --- |
| Example1 | 159.5 | 157.2 | 1.4% | 91.3% | 80.3% | 75.0% | 72.6% | 68.3% | 3.383 | 3.057 |
| C. Exp. 1 | 148.2 | 144.6 | 2.4% | 90.6% | 78.8% | 72.2% | 67.9% | 64.3% | 3.370 | 3.025 |
| C. Exp. 2 | 154.0 | 152.9 | 0.7% | 91.2% | 76.4% | 68.3% | 63.2% | 60.6% | 3.371 | 3.008 |

Crustal Size

Table 3 shows the crystal sizes, obtained by the Rietveld method, of the powders.

TABLE 3

| sample | Crystal Size (nm) |
| --- | --- |
| Example 1 | 70.5 |
| Comparative Example 1 | 78.6 |
| Comparative Example 2 | 71.8 |

Obviously other lithium containing electrochemically active powders may be prepared by analogous methods by using different starting material. In particular, phosphates of other transition metals such as Mn, Co, Ni. V, Cr, Ti, Mo, Nb, and W may be used instead of or in addition to Fe$_3$(PO4)$_2$·8H$_2$O to prepare Lithium metal phospates according to the invention with mixed metal or with metals other than Fe.

The invention claimed is:
1. A method for making a carbon coated electrochemically active powder, said powder comprising particles containing a compound represented by formula $Li_aM_m(XO_4)_n$ wherein $0<a\leq3.2$; $1\leq m\leq2$; and $1\leq n\leq3$; M comprises at least one transition metal and optionally at least one non-transition metal; and X is selected from the group consisting of S, P and Si; said method comprising:

i. providing a mixture of precursors as follows:
   a. a source of Li;
   b. a source of an element M;
   c. a source of an element X; and
   d. a source of carbon;
   wherein the sources of elements A, M and X are introduced in whole or in part in the form of compounds having the at least one source element;
ii. heating up said mixture in a sintering chamber to a sintering temperature of 500° C. to less than 800° C. and sintering said mixture at said sintering temperature for a first period of time of less than or equal to 2 hours, wherein a stream of inert gas is provided to said chamber;
iii. continuously injecting fresh steam in said sintering chamber for an uninterrupted injection time before or during the heating up, and before or during the sintering of the mixture; thereby producing particles containing said compound wherein the particles are at least partially coated with a carbonaceous material containing a highly graphitized carbon; and
iv. cooling said powder.

2. The method according to claim 1, wherein X is P.

3. The method according to claim 1, wherein the carbon coated electrochemically active powder comprises particles which contain a core which is provided with a coating layer, whereby the core contains a compound represented by formula $Li_aM_m(XO_4)_n$ wherein M comprises at least one transition metal and optionally at least one non-transition metal; and X is chosen among S, P and Si; wherein $0<a \leq 3.2$; $1 \leq m \leq 2$; and $1 \leq n \leq 3$; wherein said particles are at least partially coated by said coating layer and whereby the coating layer comprises a carbonaceous material, said carbonaceous material comprising a highly ordered graphite, wherein said highly ordered graphite has a ratio $(I_{1360}/I_{1580})$ of a peak intensity $(I_{1360})$ at 1360 cm$^{-1}$ to a peak intensity $(I_{1580})$ at 1580 cm$^{-1}$, obtained by Raman spectrum analysis, of at least 1.5 and at most 3.05.

4. The method of claim 1, wherein M comprises a transition metal comprising iron, manganese, vanadium, titanium, molybdenum, niobium, tungsten, zinc or mixtures thereof.

5. The method of claim 1, wherein the compound represented by formula $Li_aM_m(XO_4)_n$ is characterized by the formula $LiMPO_4$, and where M comprises a metallic cation belonging to the first line of transition metals.

6. The method of claim 1, wherein the compound represented by formula $Li_aM_m(XO_4)_n$ is characterized by the formula $Li_aM_{1-y}M'_y(XO_4)_n$, in which $0 \leq a \leq 2$; $0 \leq y \leq 0.6$ and $1 \leq n \leq 1.5$, wherein M comprises a transition metal or a mixture of transition metals from the first line of the periodic table; M' comprises an element with fixed valence selected from the group consisting of $Mg^{2+}$, $Ca^{2+}$, $Al^{3+}$, $Zn^{2+}$ and a combination of these same elements.

7. The method of claim 1, wherein the compound represented by formula $Li_aM_m(XO_4)_n$ is characterized by the formula $Li_a(M,M')PO_4$, wherein $0 \leq a \leq 1$, M comprises one or more cations selected from the group consisting of Mn, Fe, Co, Ni, and Cu, and M' comprises an optional substitutional cation selected from the group consisting of Na, Mg, Ca, Ti, Zr, V, Nb, Cr, Zn, B, Al, Ga, Ge, and Sn.

8. The method of claim 1, wherein the compound represented by formula $Li_aM_m(XO_4)_n$ is characterized by the formula $Li_uM_v(XO_4)_w$ with u=1, 2 or 3; v=1 or 2; w=1 or 3; M has a formula $Ti_aV_bCr_cMn_dFe_eCo_fNi_gSc_hNb_i$ with a+b+c+d+e+f+g+h+i=1 and X is $P_{x-1}S_x$ with $0 \leq x \leq 1$.

9. The method of claim 1, wherein the compound represented by formula $Li_aM_m(XO_4)_n$ is characterized by the formula $Li_{1+x}M_m(XO_4)_n$, wherein $0<x \leq 0.2$; m=1; and $1 \leq n \leq 1.05$; and M comprises a transition metal selected from the group consisting of iron, manganese, vanadium, titanium, molybdenum, niobium, tungsten, zinc and mixtures thereof.

10. The method of claim 1, wherein steam is continuously injected during the heating up step when a temperature in the sintering chamber is at least 150° C. and the sintering temperature is between 500° C. and 800° C.

11. The method of claim 1, wherein steam is continuously injected in said sintering chamber during the sintering step.

12. The method of claim 1, wherein steam is continuously injected in said sintering chamber during the heating-up step and is extended uninterruptedly to the sintering step, wherein said steam-injection during sintering is carried out for at least part of the sintering step.

13. The method of claim 1, wherein steam injection commences when the temperature in the sintering chamber is below the sintering temperature but is at least a fifth of said sintering temperature and the steam injection is extended uninterruptedly to the sintering step.

14. The method of claim 1, wherein steam injection during sintering is carried out for least part of said sintering step.

15. The method of claim 1, wherein the steam injection during the sintering step is carried out for an injection time of at most ½ of the total sintering time.

16. The method of claim 1, wherein steam is injected into the sintering chamber during the heating up step for at least 25% of the total time needed to heat up said mixture of precursors to the sintering temperature.

17. The method of claim 1, wherein steam is injected into the sintering chamber during the sintering step for at least 15% of the total sintering time.

18. The method of claim 1, wherein when injected, the steam is at a temperature of at least 150° C.

* * * * *